United States Patent

Trugman

[11] Patent Number: 5,887,141
[45] Date of Patent: *Mar. 23, 1999

[54] SYSTEMS FOR WORK ASSIGNMENT AND DISTRIBUTION FROM A SERVER TO REMOTE/MOBILE NODES BY A HIERARCHY OF SESSION WORK OBJECTS INTO WHICH EVENTS CAN BE ASSIGNED

[75] Inventor: Rodney M. Trugman, Roswell, Ga.

[73] Assignee: XcelleNet, Inc., Atlanta, Ga.

[*] Notice: The term of this patent shall not extend beyond the expiration date of Pat. No. 5,680,548.

[21] Appl. No.: 953,330

[22] Filed: Oct. 17, 1997

Related U.S. Application Data

[63] Continuation of Ser. No. 348,616, Dec. 2, 1994, Pat. No. 5,680,548.

[51] Int. Cl.⁶ ............................................. G06F 13/00
[52] U.S. Cl. ......................... 395/200.57; 395/200.33; 395/200.56
[58] Field of Search ................... 345/357, 334, 345/326, 358; 364/491; 395/200.57, 200.33, 200.56

[56] References Cited

U.S. PATENT DOCUMENTS

| | | | |
|---|---|---|---|
| 4,318,173 | 3/1982 | Freedman et al. | 395/673 |
| 4,642,758 | 2/1987 | Teng | 364/200 |
| 4,937,784 | 6/1990 | Masai et al. | 395/674 |
| 4,951,193 | 8/1990 | Muramatsu et al. | 711/206 |
| 4,969,092 | 11/1990 | Shorter | 395/672 |
| 4,974,149 | 11/1990 | Valenti | 395/200.47 |
| 5,155,842 | 10/1992 | Rubin | 395/575 |
| 5,276,879 | 1/1994 | Barry et al. | 395/676 |
| 5,287,434 | 2/1994 | Bain et al. | 395/101 |
| 5,295,244 | 3/1994 | Dev et al. | 345/357 |
| 5,315,701 | 5/1994 | DiNicola et al. | 345/502 |
| 5,329,626 | 7/1994 | Klein et al. | 395/200.78 |
| 5,345,587 | 9/1994 | Fehskens et al. | 711/146 |
| 5,420,978 | 5/1995 | Tozawa et al. | 345/334 |
| 5,434,852 | 7/1995 | La Porta | 370/385 |
| 5,448,731 | 9/1995 | Wang et al. | 395/673 |
| 5,471,399 | 11/1995 | Tanaka et al. | 364/491 |
| 5,479,601 | 12/1995 | Matheny et al. | 345/326 |
| 5,483,641 | 1/1996 | Jones et al. | 395/823 |
| 5,487,170 | 1/1996 | Bass et al. | 395/732 |
| 5,548,705 | 8/1996 | Moran et al. | 345/358 |

FOREIGN PATENT DOCUMENTS

WO 92/22033   12/1992   WIPO.

OTHER PUBLICATIONS

*RemoteWare Server Setup Guide, Software Release 1.4*, XcelleNet, Inc., 1992.
*RemoteWare Server Operations Guide, Software Release 1.4*, XcelleNet, Inc., 1992.
PCT International Search Report, PCT/US95/14491, May 31, 1996.
"Spooling for Group Output by User", IBM TDB vol. 28, NR 12, p. 5283, May 1986.

*Primary Examiner*—Thomas C. Lee
*Assistant Examiner*—David Ton
*Attorney, Agent, or Firm*—Myers Bigel Sibley & Sajovec

[57] ABSTRACT

Efficient distribution of work from a server to remote/mobile nodes is provided by a hierarchy of Session Work Objects into which events can be assigned. Session Work Objects can also be assigned to other Session Work Objects in the hierarchy. Session Work Objects can then be assigned to sessions, nodes, or users. Small numbers of related events can be grouped together, thereby simplifying the distribution of work.

17 Claims, 7 Drawing Sheets

SYSTEMS FOR WORK ASSIGNMENT AND DISTRIBUTION FROM A SERVER TO REMOTE/MOBILE NODES BY A HIERARCHY OF SESSION WORK OBJECTS INTO WHICH EVENTS CAN BE ASSIGNED

This application is a continuation of application Ser. No. 08/348,616, filed Dec. 2, 1994, now U.S. Pat. No. 5,680,548, issued Oct. 21, 1997.

FIELD OF THE INVENTION

This invention relates to data processing systems and methods and more particularly to systems and methods for linking a plurality of data processing systems for communication therebetween.

BACKGROUND OF THE INVENTION

Since the early days of computing, data processing systems have been linked to users via communications networks. Initially, a host or mainframe computer was linked to user terminals. With the advent of the personal computer, "intelligent workstations" have been linked to host computers.

As more and more computing systems have become personal computer based, personal computers have been linked into Local Area Networks (LAN) which are managed by a server to provide client/server applications. These client/server networks can also be linked to mainframe and other computers.

Traditional LAN-based client/server networks, and most other computer networks, assume a near-ideal operating environment. In particular, LANs assume continuously connected users who are computer literate. Since the LAN connections between computers are hard wired, error-free reliable connections are assumed. Thus, the LAN-based client/server environment allows knowledge-workers and PC professionals to operate in a near ideal environment.

Unfortunately, traditional LAN-based client/server networks poorly serve the needs of important classes of users, referred to herein as "remote/mobile" users. As used herein, "remote/mobile" means "temporarily and intermittently linked", wherein temporarily means "lasting for a limited time" and intermittently means "coming and (going at intervals, not continuous, or occasional". An example of remote/mobile users is point-of-sale terminals in a chain of, for example, 5,000 retail stores, where each point-of-sale terminal needs to connect to the headquarters' central computer for short periods of time for communication therebetween, rather than continuously. Another example of remote/mobile users is a mobile sales force which typically uses laptop computers and connects with the home office for short periods of time from various locations, such as hotels, customer sites or cars.

Users of remote/mobile computers, such as laptop and notebook computers, point-of-sale systems, personal computers, personal digital assistants and the like are typically "transactional" workers rather than knowledge workers, and are not typically PC literate. They need to link to a central office on a temporary and intermittent basis to obtain information from the central office or to transfer information to the central office. The connections between the remote/mobile node and the data processing server may use switched wire or wireless connections. Accordingly, communications tend to be slow and unreliable.

Traditional LAN-based client/server systems have attempted to meet the needs of remote/mobile users by allowing remote dial-in to the LAN. However, remote dial-in has heretofore worked effectively only for small numbers of remote/mobile users, and has used a LAN-based paradigm which is not amenable to the unique requirements of the remote/mobile user.

A major breakthrough in remote/mobile computing was provided with the introduction of RemoteWare Versions 1.0–1.4 by XcelleNet, Inc., Atlanta, Ga., assignee of the present invention. The RemoteWare systems provided a communication model which was specifically geared to remote/mobile environments. One or more RemoteWare servers can be connected to a LAN to control the exchange of information between a central site and hundreds or thousands of remote/mobile computers and their users and applications. The RemoteWare server provides information management, resource management, scheduling, communication services, information monitoring and control services needed by the remote/mobile network.

Communications between the server and the remote/mobile nodes are designed to keep connect time at a minimum. Thus, the connection cost is minimized and the time that the transactional worker needs to spend connected to the central system are minimized. Moreover, the system is designed to support low bandwidth and unreliable connections.

RemoteWare Version 1.4 allows a server to centrally manage the assignment and distribution of work to large numbers of remote/mobile terminals. Work assignment and distribution is effected by providing a large number "events". An event defines at least one action which is performed in a remote/mobile communication between the server and the node. The events can be grouped into lists which can be assigned to nodes. Alternatively, events can be grouped into applications which are assigned to application groups and are then assigned to users. See the publication entitled "*RemoteWare SERVER Operations Guide, Software Release 1.4*", Copyright 1992, XcelleNet, Inc., the disclosure of which is hereby incorporated herein by reference.

Unfortunately, as the complexity of the remote/mobile communications increase, the number of events which need to be grouped into lists or applications may become large. Management of remote/mobile communications is cumbersome using large lists of events. Accordingly, notwithstanding the vast improvement of the RemoteWare system, there is a need to provide increased flexibility in the assignment of large numbers of events to nodes and users to effect remote/mobile communications.

SUMMARY OF THE INVENTION

The invention provides efficient distribution of work from a server to remote/mobile nodes by providing a hierarchy of Session Work Objects into which events can be assigned. Session Work Objects can also be assigned to other Session Work Objects in the hierarchy. Session Work Objects can then be assigned to sessions, nodes, or users. Thus, events can be assigned to sessions, nodes, users via a hierarchy of Session Work Objects. Smaller numbers of related events can therefore be grouped together, thereby simplifying the distribution of work.

According to the present invention, work is distributed from a server to remote/mobile nodes by providing in the server a plurality of events, each of which define at least one action which is performed in a remote/mobile communication between the server and the node. Selected events are grouped into a plurality of Session Work Objects. Attributes are assigned to the Session Work Objects. Attributes define times for executing the associated Session Work Objects. Other attributes define conditions under which the associated Session Work Object will or will not execute. Session Work Objects are assigned to nodes. The Session Work Objects execute on the server to thereby effect remote/mobile communications between the server and the defined nodes at the defined times. Further attributes of the Session Work Objects can define priority of the Session Work Object so that the Session Work Objects execute on the server in priority order. Events which are grouped as part of the Session Work Object can also be defined as occurring "before" establishment of a remote/mobile communications link, "during" establishment of a remote/mobile communications link or "after" termination of the remote/mobile communications link. Thus, the connection time of the remote/mobile communication link is reduced.

In particular, according to the present invention, selected events are grouped into Electronic Software Distribution Objects for regularly updating files which are distributed during remote/mobile communications. Selected events are also grouped into Worklist Objects for defining tasks to be performed during a remote/mobile communication. Selected Electronic Software Distribution Objects and selected Worklist Objects are also grouped into Group Objects. A plurality of sessions is defined to specify times for linking a node and the server for remote/mobile communications therebetween.

Selected Group Objects are assigned to sessions such that the selected Group Objects execute when the session is executed. Electronic Software Distribution Objects and Worklist Objects may also be assigned directly to sessions. Selected Group Objects are also assigned to selected nodes such that the selected Group Objects execute each time a node is linked to the server for remote/mobile communications therebetween. Selected Electronic Software Distribution Objects and Worklist Objects may also be assigned directly to a node. After these assignments are made, the Electronic Software Distribution Objects, the Worklist Objects and the Group Objects are caused to execute on the server to thereby effect remote/mobile communications between the server and the nodes.

Selected Electronic Software Distribution Objects and selected Worklist Objects may also be grouped into Application Objects. Selected Application Objects may be grouped into Application Group Objects. Application Group Objects and Application Objects may be assigned to users and/or user groups. Users and/or user groups may be assigned to selected nodes.

By linking the events to sessions, nodes and users via a hierarchy of Session Work Objects, large numbers of events need not be linked directly to sessions, nodes and users. Management of remote/mobile communications is thereby simplified, and efficiency of the remote/mobile communications is enhanced.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
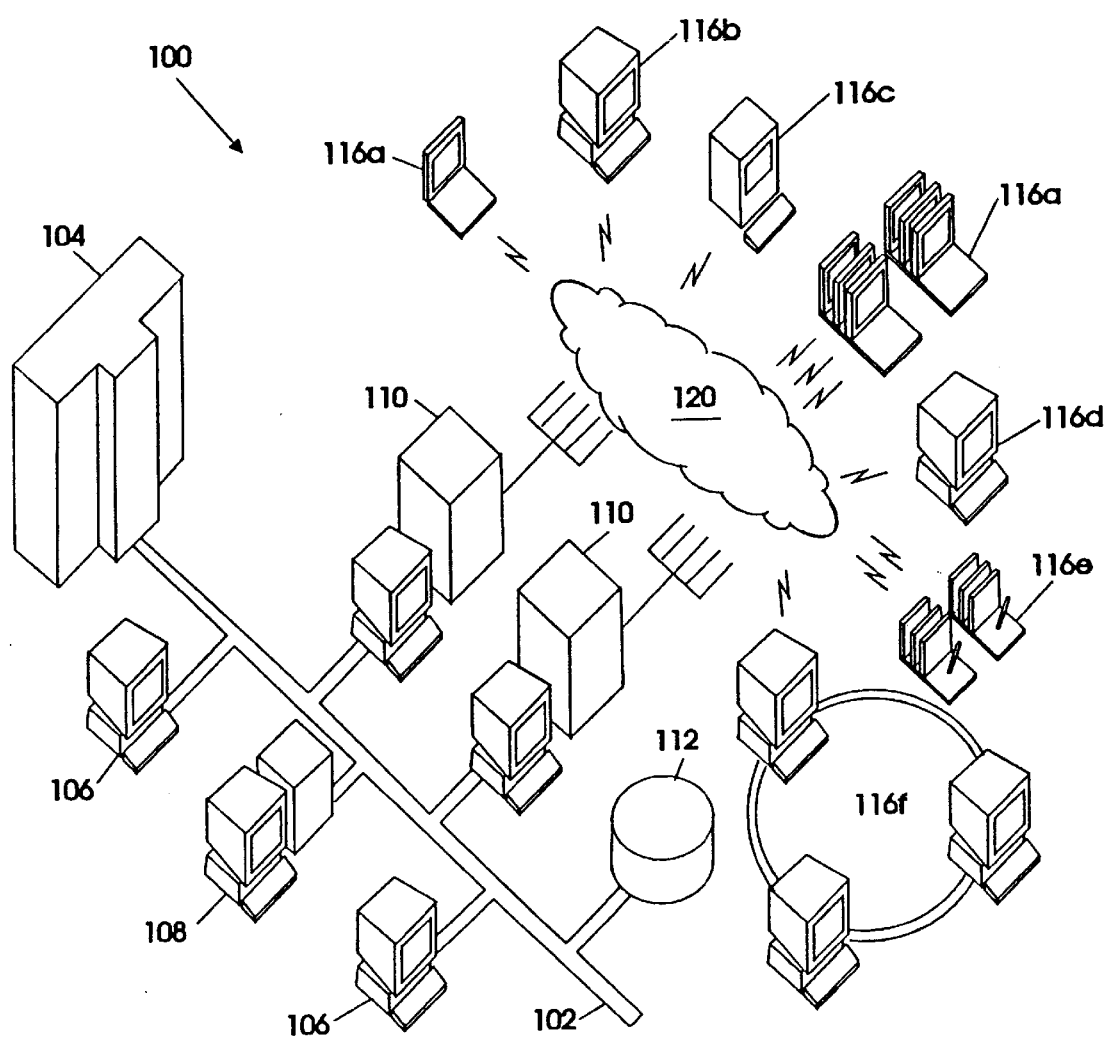
FIG. 1 is a block diagram of a known remote/mobile communications system with which the present invention may be used.

Referring now to FIG. 1, a remote/mobile communication system in which the present invention may be practiced is illustrated. As shown in FIG. 1, remote/mobile communication system 100 includes a local area network (LAN) 102. Mainframe computer 104, LAN workstations 106, a LAN file server 108 and a LAN database 112 are provided and interconnected in a manner well known to those having skill in the art.

In order to provide remote/mobile communications, one or more remote/mobile servers 110 are attached to the LAN 102. Each remote/mobile server may be a personal computer running in the OS/2 operating environment and which runs RemoteWare Versions 1.0–1.4 marketed by the assignee of the present invention. RemoteWare Versions 1.0–1.4 act as the control point for information management, providing the resource management, scheduling, communication services, information monitoring and control services needed by the remote/mobile network. RemoteWare Version 1.4 is described in a manual entitled "*RemoteWare SERVER Operations Guide, Software Release* 1.4", Copyright 1992, XcelleNet, Inc., the disclosure of which is hereby incorporated herein by reference.

Remote/mobile servers 110 are linked to a remote/mobile communications network 120. Remote/mobile communications network 120 includes various wire line connections such as switched analog, ISDN, and X.25 or wireless connections such as switched and digital cellular, satellite and radio frequency. Although leased lines and other permanent communication lines may also be used, these are not preferred due to their high cost.

A large number (typically hundreds or thousands) of remote/mobile data processing nodes 116a–116f are connected to remote/mobile communications network 120. Each remote/mobile data processing node, also referred to herein as a "node", includes a data processing unit which is temporarily and intermittently linked to server 110. Nodes 116 may include laptop computers 116a, personal computers 116b, MacIntosh computers 116c, point-of-sale systems 116d, pen-based systems 116e and other remote LANs 116f. It will be understood by those having skill in the art that remote/mobile data processing nodes 116 may include any microprocessor driven units such as cellular telephones, personal digital assistants and other workstations and terminals. Each node 116 preferably runs a node software program in background, and which operates in conjunction with the remote/mobile server 110. The node software initiates or responds to communications sessions, supports interactive remote console sessions, relays node status information to the server 110, and relays command line level instructions to the node operating system. An example of node software is RemoteWare Node Version 1.4, marketed by the assignee of the present application. RemoteWare Node Version 1.4 is described in a publication entitled "*RemoteWare SERVER Setup Guide, Software Release* 1.4", Copyright 1992, XcelleNet, Inc., the disclosure of which is hereby incorporated herein by reference.

As already described, the remote/mobile communication system is designed to reduce connect time. By reducing connect time, the costs of the physical network, such as a cellular phone network or a long distance phone line network, are minimized. Moreover, the amount of time that a node (and an end user operating the node) needs to be on line is reduced. Finally, error free connections are provided, notwithstanding the inherent unreliability of the communications links.

Figure 2:
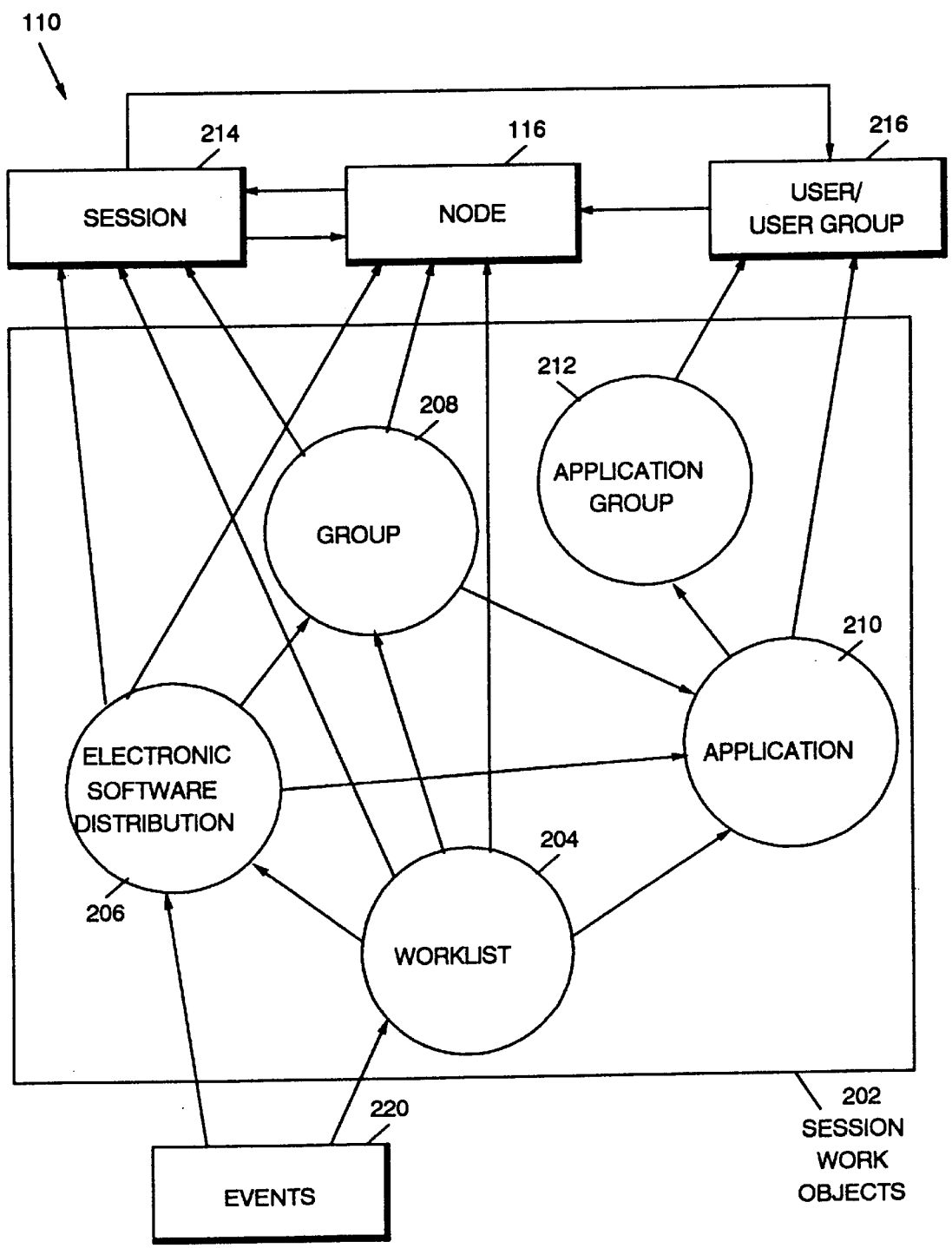
FIG. 2 is a block diagram of a hierarchy of Session Work Objects according to the present invention.

Referring now to FIG. 2, a block diagram of a hierarchy of Session Work Objects according to the invention is illustrated. As shown in FIG. 2, Session Work Objects (SWO) 202 are used for linking a plurality of events 220 to a plurality of sessions 214, nodes 116 and users and/or user groups 216. In general, SWOs are units of work that are executed during a session. They are central to activity between the server 110 and the nodes 116.

A hierarchy of SWOs 202 is provided as shown in FIG. 2, using object oriented programming techniques in an object oriented computing environment. As is well known to those having skill in the art, in an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the object class. Object classes can be defined to be subclasses of parent classes. Subclasses inherit all the data characteristics of the parent class. They can add additional data and methods and they can override or redefine any data elements or methods of the parent class. Object oriented computing environments are well known to those having skill in the art and need not be described further herein.

Still referring to FIG. 2, there are five types of SWOs. When and how an object is executed depends upon selected attributes and the object's assignments as will be described below. The types of SWOs are as follows:

(1) The Electronic Software Distribution (ESD) SWO 206 is a collection of events that electronically distribute software that resides on the server 110. The ESD SWO may also contain Worklists of events 220 that are to execute before and/or after the ESD events, as described below.

(2) The Worklist SWO 204 is a collection of events that are executed during a communications session between the server 110 and node 116 or are executed to perform server system level activities, such as deleting or renaming files.

(3) The Group SWO 208 is a grouping of ESD and Worklist Objects 206 and 204, respectively.

(4) The Application SWOs 210 are ESD, Worklist and Group Objects 206, 204 and 208, respectively, that are related to the distribution and maintenance of applications.

(5) The Application Group Object 216 is a grouping of Application Objects.

Execution of an SWO 202 is limited by several attributes. These attributes provide the ability to enable and disable the SWO, to define an execution window for the SWO, to set an activation/deactivation date, limit the SWO to particular node types, to set a priority that orders the execution of an SWO within a session, and to define other conditions under which the SWO will or will not execute.

The execution of an SWO also depends on its assignments. As shown in FIG. 2, SWOs can be assigned to sessions 214, nodes 116 and users or user groups 216. In particular, ESD, Worklist or Group SWOs 206, 204 and 208, respectively, can be assigned to a node 116 to have the SWO executed each time a remote/mobile communication session takes place with an assigned node 116. ESD, Worklist or Group SWOs 206, 204 and 208, respectively, can also be assigned to a session 214 so that the SWO is automatically executed whenever that session runs. Application SWOs 210 and Application Group SWOs 212 can also be assigned to users and/or user groups 216 so that the SWO is executed each time a remote/mobile communications session takes place with an assigned user's node.

The creation of SWOs 202 will now be described. In general, an ESD SWO 206 is created if there are files in system 100, residing on the server 110, database 112, mainframe 104 or elsewhere, that are to be regularly updated at a node 116. When an ESD SWO is executed, the server checks all files specified in the event list and builds a list of what needs to be updated. The files are then updated in one efficient remote/mobile communications link.

Worklist SWOs 204 are created for tasks that are to be completed at the node 116, at the server 110, or both. When the SWO is executed, each incorporated event is processed in order.

Group SWOs 208 are related ESD and Worklist SWOs that are assigned to multiple sessions or many nodes. Grouping of ESD and Worklist SWOs can save time when making assignments. In addition, when ESD and Worklist objects are grouped, the group, instead of the individual objects that make up the group, is listed at the node, so the user executes either all or none of the objects in the group.

Application SWOs 210 are applications that are to be made available to a user's desktop or that are assigned directly to users so that licensing can be tracked. Application Group SWOs 212 are applications that are assigned to many users or user groups. Grouping of Application SWOs can save time when making assignments. When Application SWOs are grouped, the individual SWOs that make up the group, instead of the group, are listed at the node, so the user can execute the individual SWOs. An Application Group SWO is then created for each user's desktop.

Events will now be defined and described. There are four types of events: file transfer events are commands that execute a specified form of data exchange between the node 116 and the server 110 during a remote/mobile communication. Operating system events execute typical system level commands, such as DIR or COPY, on either the server or on a node. Session control events affect the way a session works. They include conditional statements, such as IF TRUE or END IF. Finally, server events are specific to the server 110. They control work queues, worklists, user alarms and server and agent processes.

A worklist SWO 204 can contain any valid event from the four event groups described below. In contrast, the ESD SWO can only contain selected events: SEND FILE, MAKE DIRECTORY, CHECK FILE, and COMMENT commands. ESD SWOs can, however, include worklists of pre-ESD events and post-ESD events which can contain any valid event.

Each event also includes an option as to when and where the event will occur. Events can be executed in one of three ways: before a remote/mobile communication session with a node is established; during the remote/mobile communication session with a node; and after the remote/mobile Communication session has ended.

There are two file transfer events: GET file(s) from a node and SEND file(s) to a node. The GET command retrieves a node file or files and copies it or them to the specified server file. SEND sends the specified server file to the node.

Operating system events include the following system level commands: APPEND file(s) to another; ASCII APPEND file(s) to another; CHECK DISK; CHECK file; COPY file(s); DELETE file(s); DIRectory listing; EXECUTE program; GET file status; MAKE DIRectory; REBOOT node at end of session; REMOVE DIRectory; RENAME file(s); SET node TIME; and WAIT for file to exist. The CHECK DISK and CHECK file events are described in application Ser. No. 08/348,596, filed Dec. 2,1994, entitled "Methods and Systems for Preventing Unnecessary File Transfers Between a Server and a Remote Node", now abandoned, the disclosure of which is hereby incorporated herein by reference.

The session control events are as follows: COMMENT; ELSE IF; END IF; END REPEAT; END SESSION; IF previous event FALSE; IF previous event TRUE; REPeat IF previous event FALSE; REPeat IF previous event TRUE; SET VARiable; TEST VARiable; TEST if node is in GROUP.

Server events are as follows: EXCEPTION worklist; NOTIFY os/2 server; USER defined ALARM; insert WORKLIST; execute server WORKQUEUE. The EXCEPTION worklist is a list of events executed on the server after a session with a node has failed. The NOTIFY event is an advanced command that sends a message to the specified OS/2 server process.

Figure 3:
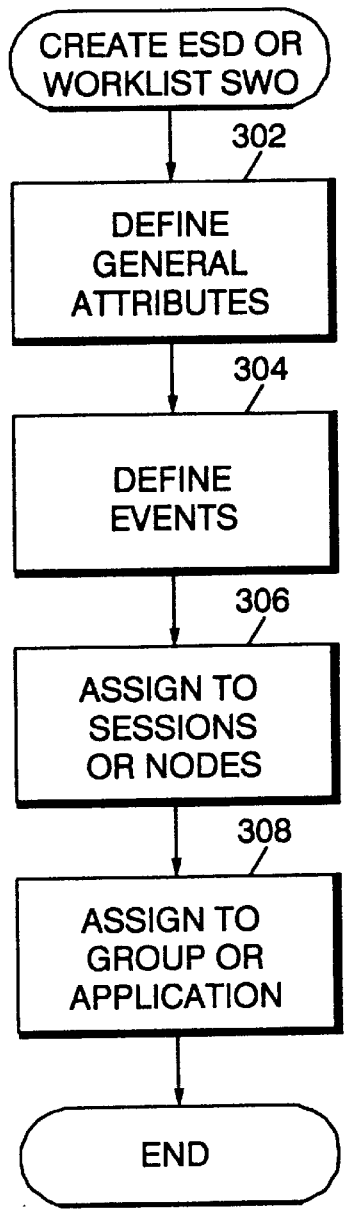
FIG. 3 is a flowchart illustrating operations for creating Electronic Software Distribution and Worklist Session Work Objects according to the present invention.

Referring now to FIG. 3, creation of ESD or Worklist SWOs 206 and 204 will now be described. At Block 302, general attributes of the SWO are defined. Although much of an SWO's definition depends on its type, there are general attributes that are selected for every SWO. The attributes include the following:

Status: If disabled, the SWO is not executed. When enabled, the SWO is executed as assigned Execution: The available choices are default, forced or requestable. Default indicates that the SWO is executed unless disabled by the remote user. Forced indicates that the SWO is always to be executed. Requestable indicates that the SWO is only executed when requested by the remote user. Forced and requestable SWOs are described in application Ser. No. 08/348,486 filed , Dec. 2, 1994, entitled Methods and System for Delivering Files from a Server to Remote/Mobil Node (now abandoned), the disclosure of which is hereby incorporated herein by reference.

Priority: This setting determines the order of the execution of the SWOs in a session. 0 is the lowest priority, 255 is the highest priority.

Owner: The default owner is user. However, other applications may be designated as the owner.

Limit Object Execution to Node Type: This attribute limits execution of the object to a specific node type or types.

Execution Window: This attribute limits the execution of the SWO to a specific time range. For example, if an SWO is assigned to a node, it will execute whenever a remote/mobile session with a node takes place. However, if an execution window is specified, it will only execute during the specified time period, no matter how many sessions take place.

Activation/Deactivation: This attribute is used to set a date or time to turn on or off SWO execution. For example, if a Worklist SWO executes events related to end-of-year procedures for a company, the SWO should be activated in January of the next year.

Referring again to FIG. 3, after general attributes have been defined, events for the ESD or Worklist SWO are defined at Block 304. As described above, there are four categories of events. These events can be used in any combination to automate system workflow and maintenance activities, such as retrieving files from a node, deleting old files from a node or the server, setting the node's time, executing programs, etc. As also already described, the ESD Work Object is a specialized type of Worklist Object that can only contain SEND FILE, MAKE DIRectory, CHECK FILE, and COMMENT commands in the event list. When specifying events in an event list, each event can be tagged for execution before, during or after a session, except for ESD SWOs in which all events are "during" events.

Referring again to FIG. 3, the ESD or Worklist SWOs are then assigned to sessions or nodes at Block 306. If a node is assigned to an SWO, the SWO is executed each time a connection is made to that node. However, certain conditions may cause the SWO not to execute, such as the execution window or deactivation time described above. If a session is assigned to an SWO, the SWO is executed each time the session is run. Again, however, certain conditions may cause the SWO not to execute.

Referring now to Block 308, the ESD SWO 206 and/or Worklist SWO 204 is also assigned to a Group SWO 208 and/or an Application SWO 210. Assignment of the SWO to a parent SWO may use a displayed parent assignment card, which allows child SWOs, such as ESD, Worklist and Application SWOs to be assigned to parent SWOs, such as Group and Application Group SWOs. The SWO may be directly assigned to a group if an SWO is selected and assigned to that group. An SWO is indirectly assigned to a group if that SWO is already assigned to a group to which an SWO is assigned.

Figure 4:
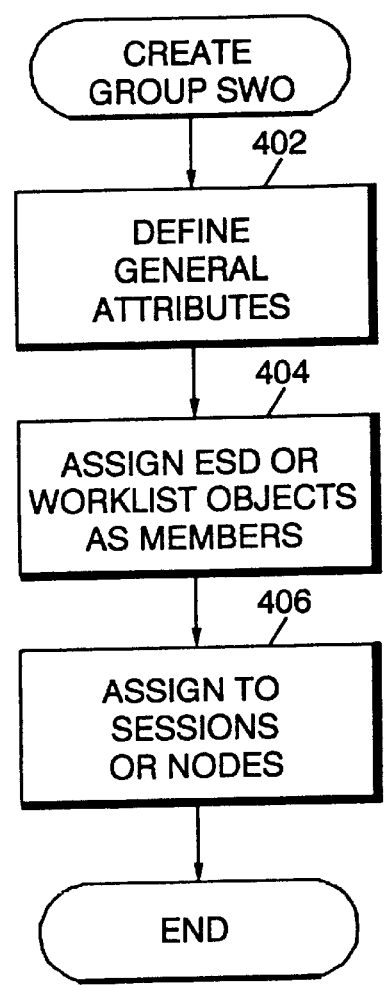
FIG. 4 is a flowchart illustrating operations for creating a Group Session Work Object according to the present invention.

Referring now to FIG. 4, operations for creating Group SWO 208 of FIG. 2 will be described. At Block 402, general attributes are defined as was already described in Block 302.

At Block 404, ESD or Worklist SWOs are assigned as members of the Group SWO. Unlike ESD and Worklist SWOs, Group SWOs do not include actual event lists. Instead, Group SWOs include members which are ESD and Worklist Objects which have already been defined. A member assignment card may be accessed from a pull-down menu on the display to assign ESD and Worklist SWOs to a Group SWO. Then, at Block 406, the Group SWO is assigned to sessions or nodes in a manner already described at Block 406 of FIG. 3.

Figure 5:
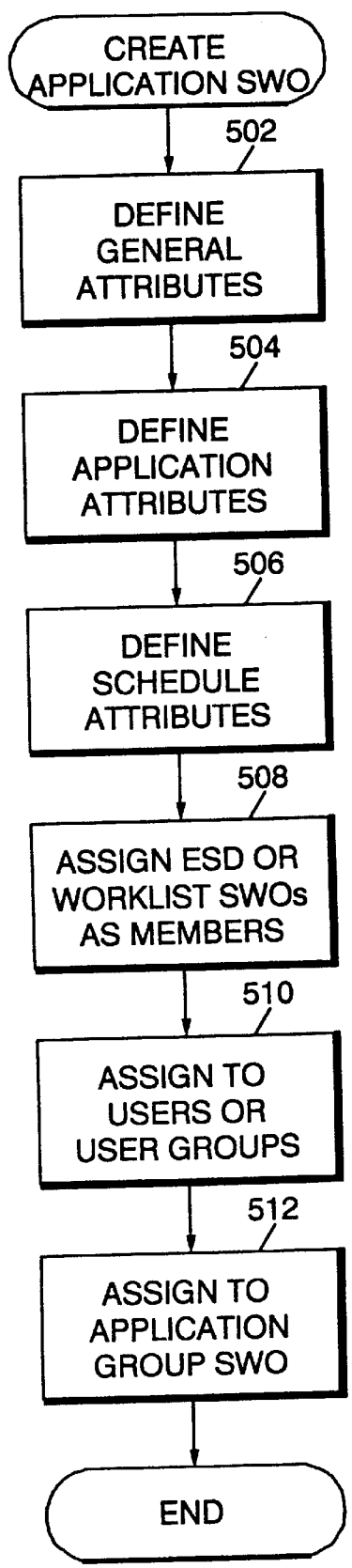
FIG. 5 is a flowchart illustrating operations for creating Application Session Work Objects according to the present invention.

Referring now to FIG. 5, Application SWOs are created by defining general attributes at Block 502 as was described in connection with Block 302. At Block 504, application attributes are then defined. In particular, in addition to general attributes, specific application attributes may be defined. Specific application attributes define the launch mode for the application SWO. Launch mode options include: NONE (the application is not launchable); USER (the application is launched by the user); AUTO NORMAL (the application is automatically launched when the user logs into his desktop); AUTO MINIMIZED (the application is automatically launched and minimized when the user logs into his desktop); and SCHEDULED (the application is a scheduled task that executes on the node at a specified time, without user intervention). An executable directory/path and command line is also entered.

Referring again to FIG. 5, schedule attributes are then defined at Block 506. If the Application SWO was defined with a (scheduled launch mode, the SWO schedule is then specified. The following schedule attributes are available:

Execute: A date and time for the execution schedule to begin.

Ending: A date and time for the execution schedule to end.

Repeat: The cycle for the scheduled application to execute at the node expressed in terms of a repeat time of hours, minutes, seconds or days.

Then, at Block 508, the ESD or Worklist SWOs are assigned as members of Application SWOs. Processing is similar to that already described at Block 308. Like Group SWOs, Application Group SWOs do not include event lists, but include members. Valid members, however, are not ESD, Worklist or Group SWOs, but are only Application SWOs that have already been defined.

Referring now to Block 510, the Application SWO is then assigned to users or user groups. The Application SWO is assigned to a user or user group by providing the identification of the user or user group in a displayed user assignment card. At Block 512, the Application SWO is also assigned to an Application Group SWO using a parent card. This assignment is opposite to that provided by the members card where a Group SWO is built with individual SWOs. Here, an individual SWO is defined, and is assigned to a group SWO.

Figure 6:
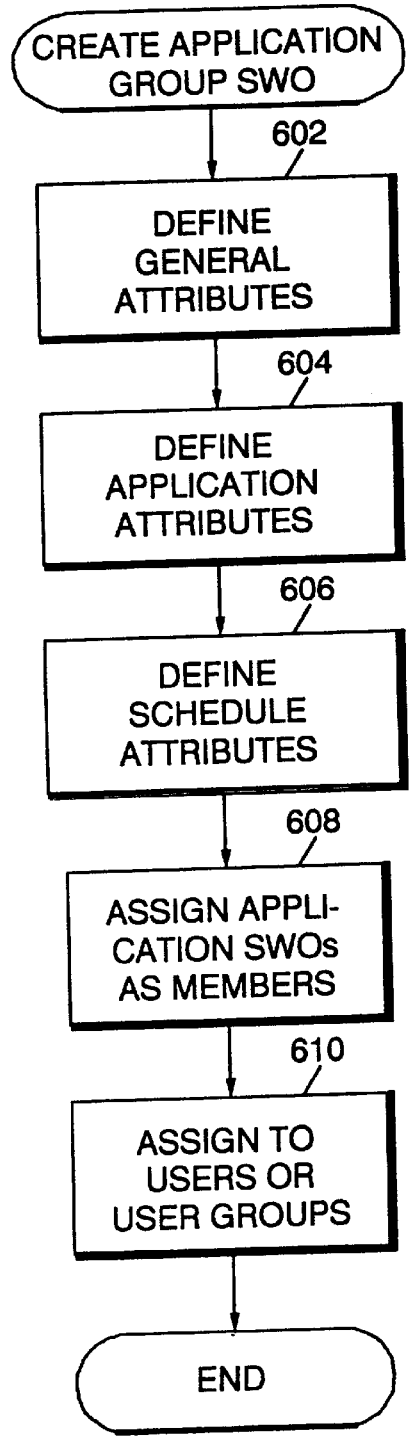
FIG. 6 is a flowchart illustrating operations for creating Application Group Session Work Objects according to the present invention.

Referring now to FIG. 6, creation of an Application Group SWO 212 is described. At Block 602, general attributes are defined, similar to Block 302. At Block 604, application attributes are defined, similar to Block 504. At Block 606, schedule attributes are defined similar to Block 506. At Block 608, Application SWOs are assigned as members, similar to Block 508. At Block 610, the Application Group SWO is assigned to users or user groups, similar to Block 510.

After the SWOs are created as shown in FIGS. 3–6, they must be enabled so that they can execute on the server. An ENABLE command is issued for each SWO which is to be enabled.

Having defined the SWOs, the scheduled sessions are then defined. In particular, while the SWOs specify the actions that are to take place, a session 214 (FIG. 2) specifies when the actions are to take place. A session is a scheduled connection between the server 110 and a node 116 for a specific time for system level activities to take place. A session is defined by a session name, a scheduled time and date, the SWOs in the session, and the node assignments for the session.

Sessions can be scheduled on a fixed, calendar or dependent basis. Fixed interval sessions are sessions that run based on an hourly, daily, or weekly basis. Calendar based sessions are sessions that run on specified dates and times, for example Sep. 15, 1994 at 11:35:00. Dependent sessions are sessions whose schedules depends upon the completion of another session, referred to as a "monitored" session. More than one session can be dependent upon the same session. For example, if a session initiates a transfer to a mainframe computer, and the transfer needs to take place after all sales data has been collected from all nodes, the file transfer session can be dependent upon the sales data collection session if 100% of the sessions ran successfully. Each session can also be assigned a priority value which specifies the order in which sessions will be executed.

Figure 7:
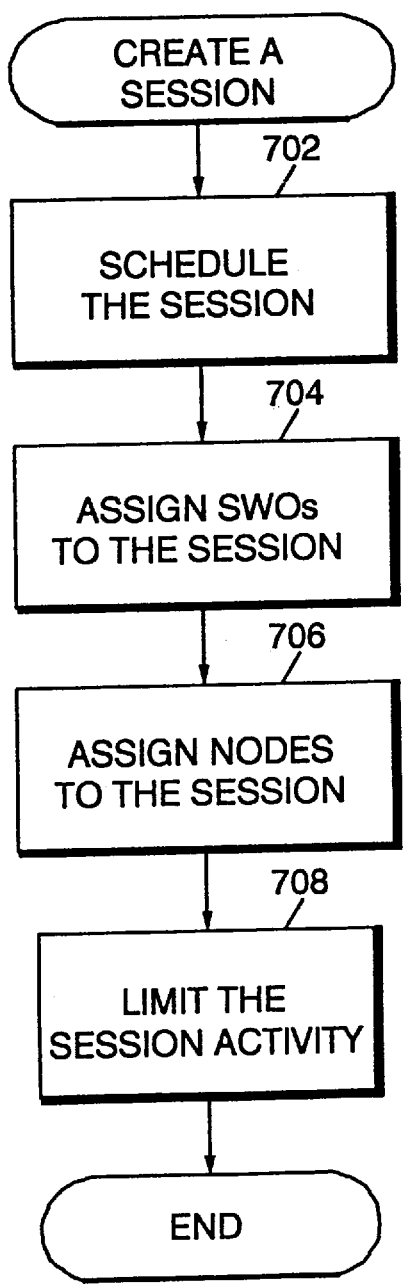
FIG. 7 is a flowchart illustrating operations for creating a session according to the present invention.

Referring now to FIG. 7, operations for creating a session will now be described. At Block 702, the session is scheduled as described above. At Block 704, SWOs are assigned to the session. As already described, only ESD, Worklist or Group SWOs can be assigned to a session. Then, at Block 706, nodes are assigned to the session. It will be understood that node groups can also be assigned to a session. Then, at Block 708, the session activity can be manipulated by limiting the session by assigned SWOs, by Application SWOs or ESD SWOs. In particular, execution can be limited only to SWOs assigned to the session process when the session is run. Accordingly, any SWOs not assigned to the node or users on that node are not executed when the session is run. A second option is to not allow Application SWOs to be processed during the session. A third option is to not allow ESD SWOs to be processed during the session.

Figure 8:
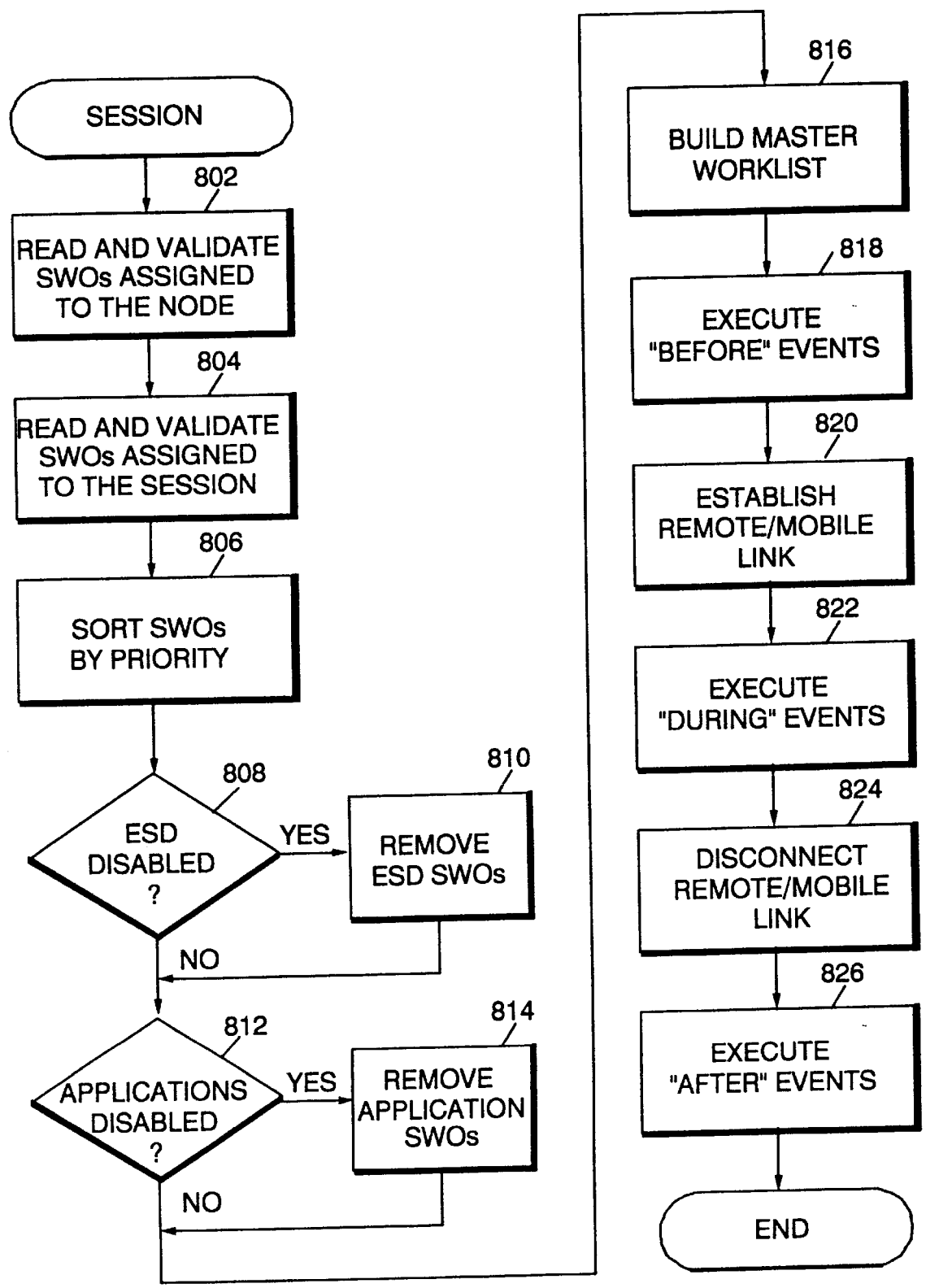
FIG. 8 is a flowchart illustrating operations performed during a session according to the present invention.

Referring now to FIG. 8, operations performed during a session will now be described. Referring now to FIG. 8 at Block 802, the SWOs which are assigned to the node are read and validated, to ensure that the event is ready to execute. For example, if an event is a SEND FILE event, a check is made to ensure that the file exists and can be accessed. At Block 804, the SWOs assigned to the session are read and validated. The SWOs are sorted by priority at Block 806. If ESD is disabled at Block 808, then ESD SWOs are removed at Block 810. If applications are disabled at Block 812, then Application SWOs are removed at Block 814.

Still referring to FIG. 8, a master worklist is built at Block 816. BEFORE events are executed at Block 818 and then a remote/mobile link is established at Block 820. DURING events are executed at Block 822 and the remote/mobile link is then disconnected at Block 824. AFTER events are executed at Block 826, and the session ends.

Figure 9:
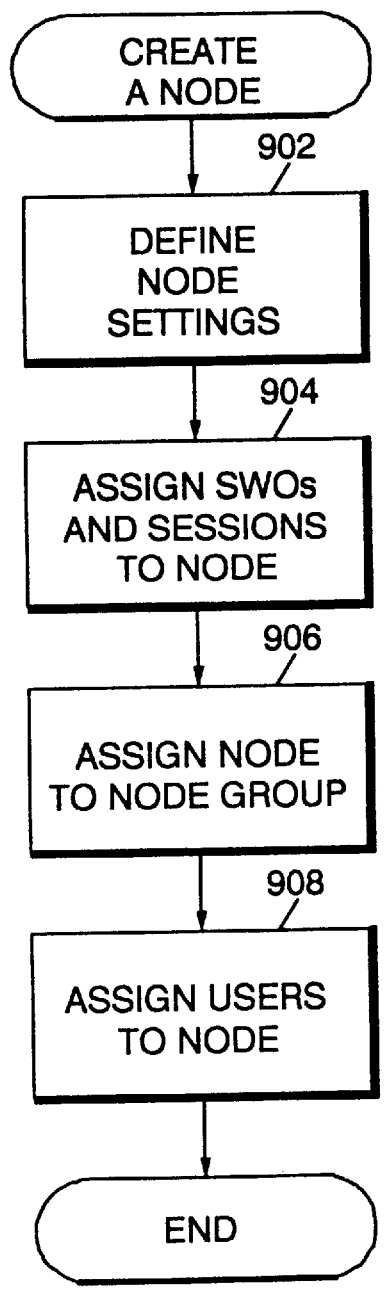
FIG. 9 is a flowchart illustrating operations for creating a node according to the present invention.

Referring now to FIG. 9, operations for creating a node 116 (FIG. 2) will now be described. At Block 902, the node settings are defined. Node settings include a node type (DOS, OS/2, Windows, etc.), a machine-to-machine password, default drive and path, and time zone designation. Also, settings concerning the communications protocol and hardware are set.

Then, at Block 904, SWOs and sessions are assigned to a node. As already described, ESD, Worklist and Group Application SWOs may be assigned to node. Sessions are also assigned to a node. At Block 906, a node is assigned to a node group. Finally, at Block 908, users are assigned to a node. It will also be understood that the operations for creating a node described in FIG. 9 can also be applied to groups of nodes or node groups.

Figure 10:
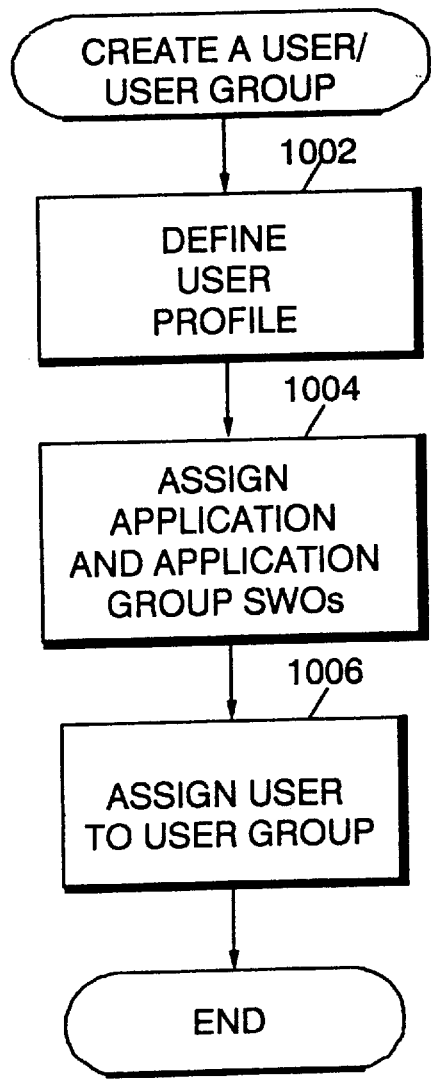
FIG. 10 is a flowchart illustrating operations for creating a user or user group according to the present invention.

Referring now to FIG. 10, operations for creating a user and/or user group will now be described. At Block 1002, a user profile is defined by specifying a name, user ID and a node name. Identification of an individual user or a user group may also be provided. At Block 1004, Application and Application Group SWOs are assigned to users or user groups. At Block 1006, a user is assigned to a user group if necessary. It will be understood that the operations of FIG. 10 may also be applied to user groups.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for distributing work from a data processing server to a plurality of remote/mobile data processing nodes which are temporarily and intermittently linked to said server for communication therebetween, said work distributing method comprising the steps of:

providing in said server a plurality of events, each of which define at least one action which is performed in a remote/mobile communication between said server and a node;

grouping selected events into a plurality of Session Work Objects;

assigning attributes to said Session Work Objects, said attributes defining times for executing the associated Session Work Objects;

assigning selected Session Work Objects to selected remote/mobile nodes;

grouping selected Session Work Objects into Group Session Work Objects such that a Group Session Work Object inherits the assigned attributes of the selected Session Work Objects so grouped; and causing said Group Session Work Objects to execute on said server to thereby effect remote/mobile communications between said server and the assigned nodes at the defined times.

2. A method according to claim 1 wherein:

said assigning attributes step further comprises the step of assigning attributes to said Session Work Objects for defining priority of said Session Work Object; and wherein said causing step comprises the step of causing said Session Work Objects to execute on said server in priority order.

3. A method according to claim 1 wherein:

said assigning attributes step further comprises the step of assigning an execution time period to said Session Work Objects; and wherein said causing step comprises the step of causing said Session Work Objects to execute on said server during the assigned execution time period.

4. A method according to claim 1 wherein:

said assigning attributes step further comprises the step of assigning an activation and deactivation time to said Session Work Objects; and wherein said causing step comprises the step of causing said Session Work Objects to execute on said server from the assigned activation time until the assigned deactivation time.

5. A method according to claim 1 wherein:

said assigning attributes step further comprises the step of assigning execution conditions to said Session Work Objects; and wherein said causing step comprises the step of causing said Session Work Objects to execute on said server upon occurrence of the assigned execution conditions.

6. A method according to claim 1 wherein said step of grouping selected events into a plurality of Session Work Objects further comprises the step of tagging each of said events for execution before a remote/mobile communication link is established, while said remote/mobile link is established or after said remote/mobile communications link is disconnected.

7. A method according to claim 6 wherein said step of causing said Group Session Work Objects to execute on said server comprises the steps of:

executing events which are tagged for execution before a remote/mobile link is established;

establishing a remote/mobile link;

executing events which are tagged for execution while said remote/mobile link is established;

disconnecting said remote/mobile link; and executing events which are tagged for execution after said remote mobile link is disconnected.

8. A system for distributing work from a data processing server to a plurality of remote/mobile data processing nodes which are temporarily and intermittently linked to said server for communication therebetween, said work distributing system comprising:

a plurality of events in said server, each of which define at least one action which is performed in a remote/mobile communication between said server and a node;

a hierarchy of Session Work Objects in said server, said hierarchy of Session Work Objects including parent classes of Session Work Objects and subclasses of Session Work Objects;

means for assigning selected events into said hierarchy of Session Work Objects;

means for assigning attributes to said hierarchy of Session Work Objects, said attributes defining times for executing the associated Session Work Objects;

means for assigning selected Session Work Objects in said hierarchy of Session Work Objects to selected remote/mobile nodes; and means for causing said hierarchy of Session Work Objects to execute on said server to thereby effect remote/mobile communications between said server and the assigned nodes at the defined times.

9. A system according to claim 8 wherein:

said means for assigning attributes further comprises means for assigning attributes to said Session Work Objects for defining priority of said Session Work Object; and wherein said causing means comprises means for causing said Session Work Objects to execute on said server in priority order.

10. A system according to claim 8 wherein:

said means for assigning attributes further comprises means for assigning an execution time period to said Session Work Objects; and wherein said causing means comprises means for causing said Session Work Objects to execute on said server during the assigned execution time period.

11. A system according to claim 8 wherein:

said means for assigning attributes further comprises means for assigning an activation and deactivation time to said Session Work Objects; and wherein said causing means comprises means for causing said Session Work Objects to execute on said server from the assigned activation time until the assigned deactivation time.

12. A system according to claim 8 wherein:

said means for assigning attributes further comprises means for assigning execution conditions to said Session Work Objects; and wherein said causing means comprises means for causing said Session Work Objects to execute on said server upon occurrence of the assigned execution conditions.

13. A computer program product for distributing work from a data processing server to a plurality of remote/mobile data processing nodes which are temporarily and intermittently linked to said server for communication therebetween, said computer program product comprising a computer-readable storage medium having computer-readable program code means embodied in the medium, the computer-readable program code means comprising:

a plurality of events in said server, each of which define at least one action which is performed in a remote/mobile communication between said server and a node;

a hierarchy of Session Work Objects in said server, said hierarchy of Session Work Objects including parent classes of Session Work Objects and subclasses of Session Work Objects;

computer-readable program code means for assigning selected events into said hierarchy of Session Work Objects;

computer-readable program code means for assigning attributes to said Session Work Objects, said attributes defining times for executing the associated Session Work Objects;

computer-readable program code means for assigning selected Session Work Objects to selected remote/mobile nodes; and computer-readable program code means for causing said Session Work Objects to execute on said server to thereby effect remote/mobile communications between said server and the assigned nodes at the defined times.

14. A computer program product according to claim 13 wherein:

said means for assigning attributes further comprises computer-readable program code means for assigning attributes to said Session Work Objects for defining priority of said Session Work Object; and wherein said causing means comprises computer-readable program code means for causing said Session Work Objects to execute on said server in priority order.

15. A computer program product according to claim 13 wherein:

said means for assigning attributes further comprises computer-readable program code means for assigning an execution time period to said Session Work Objects; and wherein said causing means comprises computer-readable program code means for causing said Session Work Objects to execute on said server during the assigned execution time period.

16. A computer program product according to claim 13 wherein:

said means for assigning attributes further comprises computer-readable program code means for assigning an activation and deactivation time to said Session Work Objects; and wherein said causing means comprises computer-readable program code means for causing said Session Work Objects to execute on said server from the assigned activation time until the assigned deactivation time.

17. A computer program product according to claim 13 wherein:

said means for assigning attributes further comprises computer-readable program code means for assigning execution conditions to said Session Work Objects; and wherein said causing means comprises computer-readable program code means for causing said Session Work Objects to execute on said server upon occurrence of the assigned execution conditions.

* * * * *